April 7, 1936.    D. E. BROWN    2,036,455
CASKET TRUCK
Filed March 15, 1935    2 Sheets-Sheet 1

Inventor
D. E. Brown
By Arthur H. Sturges
Attorney

April 7, 1936.　　　　D. E. BROWN　　　　2,036,455
CASKET TRUCK
Filed March 15, 1935　　　2 Sheets-Sheet 2
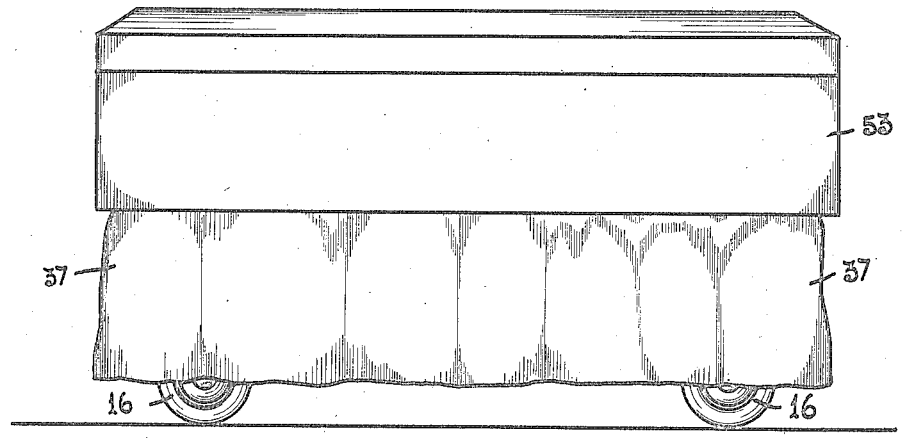
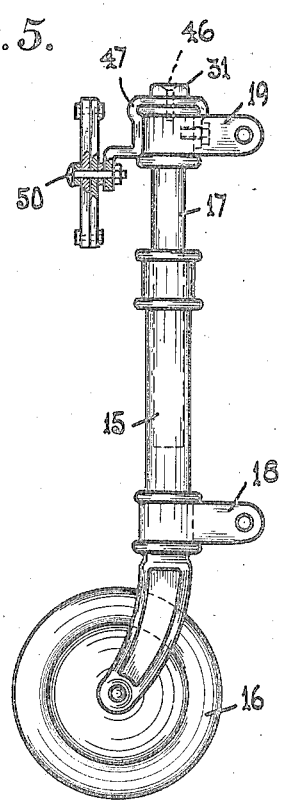
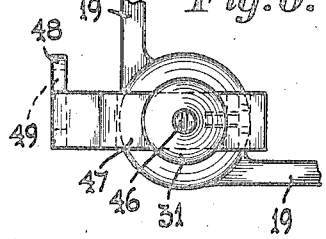
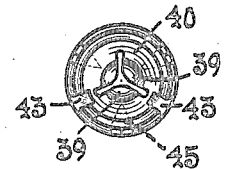
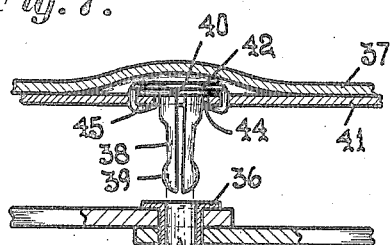
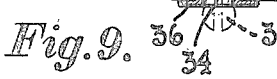
Inventor
D. E. Brown
By Arthur H. Sturges
Attorney Patented Apr. 7, 1936

2,036,455

UNITED STATES PATENT OFFICE 2,036,455

CASKET TRUCK

Derrell E. Brown, Onawa, Iowa

Application March 15, 1935, Serial No. 11,265

4 Claims. (Cl. 27—27)

The present invention relates to casket trucks and drapes therefor used particularly during funeral ceremonies.

An object of the invention is to provide an improved drape support which may be readily arranged upon and removed from a collapsible casket truck so that the drape may be disposed in an ornate manner when in use and be folded simultaneously with the truck when the latter is collapsed, so that the combined elements of the device may be quickly set up for use or collapsed when the truck is transported for use from place to place.

Another object of the invention is to provide an improved drape support for casket trucks, wherein the drape may be suspended from the upper edge portion of the truck and will follow the adjustment of the truck into long and short positions to accommodate caskets of different lengths.

A further object of the invention is to provide improved means in a drape support wherein the drape may be readily detached from the truck and a drape of different color substituted in accordance with convention, it being understood that the established custom is to provide a white drape for deceased infants and a purple or dark colored drape for adults.

A still further object of the invention is to provide a collapsible drape support for a casket truck which is adjustable and arranged to interfit with the several conventional sizes of collapsible casket trucks of present day manufacture.

With the foregoing and other objects in view, the invention will be more fully described hereinafter, and will be more particularly pointed out in the appended claims, reference being had to the accompanying drawings, wherein:—

Figure 4 illustrates a casket drape in accordance with the principles of the present invention.

Figure 5 is a side view of a truck leg and illustrating an attaching means for the new drape support therewith.

Figure 6 is a top plan view of the parts shown in Figure 5.

Figure 7 is a detailed edge view of one of the drape clips employed for suspending the drape on the drape support, a fragment of drape being shown in conjunction therewith.

Figure 8 is a side elevation of the same, the drape fragment being omitted.

Figure 9 is an end view partly in section of a fragment of the drape support.

Figure 1:
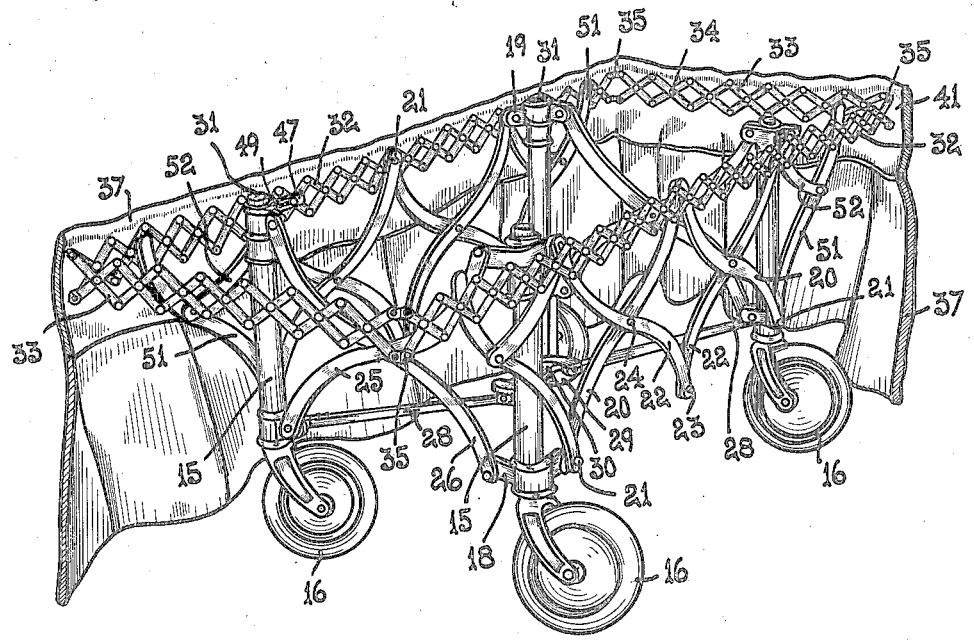
Figure 1 is a perspective view of an extended casket truck with the new drape support and a fragment of a drape applied thereto.

Referring now to the drawings a conventional type of truck is illustrated therein with which the new drape support of this invention is adapted to member without any alteration to the said truck, the latter being provided with four corner legs 15 which comprise the lower portion of posts and are of tubular construction. The legs 15 are supported upon casters 16 having rubber tires, and on each lower post or leg section is slidably mounted an upper post section 17 frictionally held in the tubular section and adapted to offer sufficient resistance for supporting the post section 17 in elevated position when the device is more or less collapsed.

Figure 2:
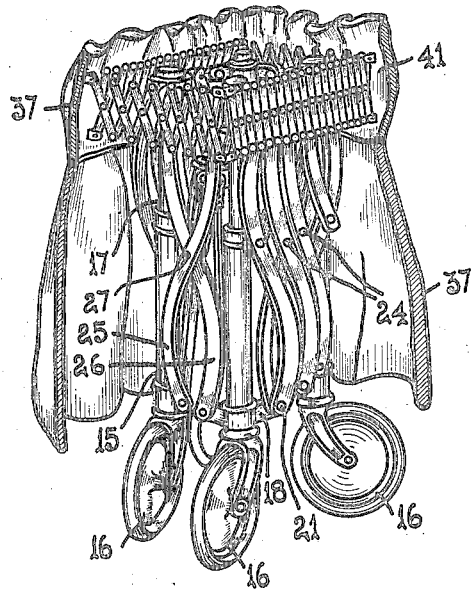
Figure 2 is a perspective view of the parts shown in Figure 1 in a collapsed relation with respect to each other.

As best shown in Figures 5, and 2 each corner leg or post is provided at the lower end of its lower section 15 with a pair of lugs 18 which extend outwardly of the post at right angles with respect to each other and the upper slidable post section 17 is in like manner provided with a pair of lugs 19 disposed at right angles to each other and in register, vertically, with the lower lugs 18.

The corner legs of the truck are connected together along the sides of the truck by means of a frame member which in the present instance comprises bars 20 pivotally connected at the lower ends each upon one of the lugs 18 at the bottom of the posts and which are connected together at their other ends on a pivot 21 to support the bars 20 in relatively angular relation. The side frame members each have a second pair of bars 22 pivotally connected each at one end to one of the upper lugs 19 of the posts and the lower opposite ends of the bars 22 are pivotally mounted upon a pivot 23 which interconnects the bars. The bars 22 are disposed across the intermediate portions of the bars 20 and are pivotally connected at such points thereto by rivets 24. Thus, the legs or posts of the truck are maintained in upright parallel relation at all times during longitudinal adjustment of the truck to move the posts toward and from each other.

The opposite ends of the truck are provided each by a pair of crossed bars 25 and 26 pivotally connected together at their crossed intermediate portions by a rivet 27 and the bars 25 and 26 are pivotally connected at their opposite ends to the lower lugs 18 and the opposite upper lugs 19 of the corner posts. As the upper section 17 of the posts have sliding movement in the lower section 15 of the posts, the frame members at the sides of the truck and the crossed bars at the ends of the truck are permitted to collapse or fold together uniformly and equally during the contraction of the truck simultaneously as to its length and width as shown in Figure 2.

The truck is braced by a bottom collapsible base structure which also serves as a means for forcing the posts apart or together during the expansion and collapsing of the truck, the brace comprises an arm 28 pivoted at its outer end to each corner post near the bottom thereof and at its inner side, the arms 28 extending diagonally inward and converging to a connecting plate 29 to which the arms 28 are pivotally connected. The plate 29 is provided with an upstanding handle 30 adapted to be grasped by introducing the hand downwardly into the top of the truck. By lifting the handle 30 the arms 28 are swung upwardly and drawn together at their lower ends as shown in Figure 2, so as to uniformly and equally draw the corner posts inwardly into contracting position.

Thus the handle 30 may be drawn upwardly for collapsing the truck and may be forced downwardly for expanding the truck. The frictional engagement of the movable parts of the truck is such as to yieldingly hold the truck in any of its adjusted positions, although any other suitable means may be employed for locking the parts when the correct adjustment is arrived at. Anchoring projections 31 project upwardly from the corner posts for receiving the bottom of the casket thereon to anchor the casket on the truck and prevent accidental shifting or displacement therefrom.

Figure 3:
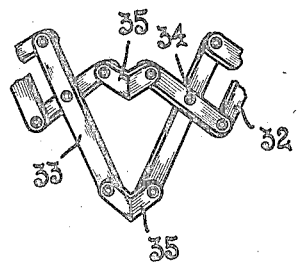
Figure 3 is a perspective view of a corner portion of the new drape support.

The means for supporting the drape about the truck includes a foldable and extensible like lazy tong drape support 32 oppositely disposed at each side of the truck and a similar lazy tong support 33 of lesser length with respect to the members 32 positioned at each end thereof comprised of comparatively short lengths of crossed bars pivotally joined together mid-way between their ends by rivets 34, the ends of said supports being also pivotally joined together form a rectangular configuration in plan, said end joints being provided by means of angle irons 35 having arms for receiving the pivot pins or rivets 34 as best shown in Figure 3.

Preferably the rivets 34 are of hollow tubular construction, as shown in Figure 9, having flanges 36 peened against the outer surfaces of the oppositely disposed bars of each lazy tong drape support which forms the drape carrier.

The preferred means for removably fastening the drape 37 to its support includes a trifurcated resilient clip 38 each fork of which is provided with an expanded and rounded head 39. The shank of the clip or snap is of substantially the same diameter as a hollow rivet and the head thereof when in its normal position as shown in Figure 7 is of greater diameter than said rivet. To removably attach a clip to a hollow rivet pivot the heads are passed through the latter, said heads compressing toward each other and immediately expanding after passing through the rivet as illustrated by the dotted lines in Figure 9. The forks of each clip are joined to a common base 40 which is formed integral with said forks. The clips are secured to a strip of flexible material or cloth 41 by means of a staple 42, said staple having a plurality of tangs 43 which are bent over the base 40 of the clip for locking said parts together as shown in Figure 8. The cloth strip 41 is provided with an adequate number of equally spaced apart apertures 44, said spaces being equivalent to the distance between the tubular rivets at the upper ends of the lazy tong bars when said lazy tongs are in a fully extended position, and any desired number of snaps may be employed for each drape support or for the drape carrier considered as a whole unit. The clips 38 are positioned through said apertures and the pointed fingers 45 carried by the body of the staples 42 are inserted through the cloth 41 and bent over as shown by the full lines in Figure 7, and the dotted lines in Figure 8.

The drape 37 is sewn to the strip 41, both the drape and strip encircling the lazy tong drape carrier when the latter is fully extended as shown in Figure 1.

As best shown in Figure 5, the heretofore mentioned anchoring projections 31 are preferably formed of rubber for a frictional contact with the bottom of a casket, said anchors being removably secured to the upper post sections 17 by means of screws 46 which are removable for positioning a portion of the brackets for supporting the drape carrier from the posts under said anchors.

As best shown in Figures 5 and 6, a bracket or attaching means consists of an arm 47 having a vertically disposed portion in parallelism with the post and a horizontally disposed portion which fits in under an anchor 46, one each of said attaching arms being secured to each post by means of said screws 46, said arms being disposed at the longer sides of the truck as shown in Figure 1 with their elongated portions 48 disposed in alignment.

Said portions 48 are provided with elongated apertures 49 for the reception therethrough of bolts 50, said bolts extending through crossed members of the said lazy tong drape supports 32. By this means inequalities of a truck frame or differences in the length of the several types thereof are accommodated, the bolts 50 being slidingly received in the elongated apertures 49 of the arms.

Means for preventing side sway of the drape support with respect to the truck comprises a foldable extension at each end of the truck in the form of a pair of arms 51 pivotally connected at the lower ends of the lateral lugs 18 of the adjacent corner posts, the arms 51 extending upwardly and being supported by half length braces 52 which are pivotally connected to the arms 51 at one end at a point intermediate the ends of the arms. The braces 52 are pivotally connected at their opposite ends upon the upper lateral lugs 19 of the posts. As the position is extended upwardly upon collapsing, the braces 52 swing the arms 51 upwardly into collapsed position. This structure prevails at each end of the truck so that these members for preventing side sway of the drape and its carrier automatically project or contract during the adjustment of the truck.

As shown to advantage in Figure 4, the drape 37 is adapted to be extended about the ends and along the sides of the truck for completely enclosing the same so that the mechanical features of the truck will not be visible, it being understood that any suitable material and color is provided for the drape.

As thus described it will be understood that the drape 37 is supported in proper position so that it will follow the contraction and expansion of the truck and thus off set the time consumed, an undesirable feature of having to remove the drape 37 each time the truck is adjusted or handled. The present invention provides a support for this drape which is so incorporated into the truck structure that it will hold the drape in proper position and contract or fold the drape proportionately to the adjustment of the truck, it being understood that any suitable number of clips 38 may be employed and that these clips may be quickly and easily released from the tubular pivots 34 when it is desired to interchange or remove the drapes, and that when the drape is once applied to the truck it may remain in position during the extension, collapsing and adjustment of the truck so that the whole may be attached as a unit and it is unnecessary to remove or replace the drape upon each setting up or knocking down of the truck.

In operation when the truck is set up and the drape 37 applied thereto, the construction of the carrier being simple there is nothing to get out of order. When the truck is collapsed or reduced in size, by drawing upwardly on the handle 30, as above explained, the truck contracts in length and width which automatically and proportionately reduces the length and width of the drape carrier, the latter contracting into the relative position of the parts shown in Figure 2.

It will be noted that as thus described the truck and drape are susceptible of being simultaneously folded or collapsed whereby when not in use they may be conveniently stored in a comparatively small space while being ready for instant use, should occasion demand, thus conserving investments in such equipment.

In operation the drape 37 may be quickly and readily removed and one of a different color or size substituted therefor by the funeral director in accordance with the age of the deceased and custom, the funeral director proceeding the casket to the church, home or the like where funeral services are to be conducted, usually in a conventional automobile, and it will be noted that the new device may be readily folded for transportation in said vehicle and may be readily extended after removal therefrom for receiving a casket such as the arrangement of the assembly including the casket 53, shown in Figure 4, at a curbstone or the like, prior to moving the casket and truck to the place of ceremony; after which the casket is transported on the truck to the hearse. Prior to the arrival of the casket at a cemetery the new device is collapsed for transportation and upon reaching the cemetery may be readily extended, the collapsible frame of the truck providing means for relatively and proportionately collapsing or extending the drape carrier and drape and after arrival at a cemetery the truck may be readily again used, the latter being maintained in an ornate appearing manner at all times, the number of folds of the drape being dependent upon the number of clips or snaps 38 employed.

It is obvious that various changes and modifications may be made in the details of construction and design of the above specifically described embodiment of this invention without departing from the spirit thereof, such changes and modifications being restricted only by the scope of the following claims.

I claim:—

1. A casket truck comprising corner posts, extensible and collapsible side and end connecting means for the posts, a collapsible and extensible lazy tongs drape carrier encircling said posts, and means for operatively supporting the carrier from said posts.

2. A casket truck comprising corner posts, extensible and collapsible side and end connecting means for supporting the posts in substantially a vertical position, and lazy tong drape supports pivotally jointed together at their ends encircling and supported by said posts, said drape carrier arranged to have relative extending and collapsing movements in a horizontal direction.

3. A drape carrier for the purpose set forth comprising a plurality of lazy tong members having tubular pivots adapted to removably receive resilient snaps for supporting a drape substantially as described.

4. A casket truck, comprising corner posts, side and end lazy tongs connections between the posts, lazy tongs carriers at the sides and ends of the truck and spaced outwardly from the upper portions of the posts and connected together at their adjacent ends, brackets between the posts and the carriers to support the latter, a drape surrounding the truck, and detachable fastener elements carried by the drape in spaced relation to the upper edge thereof for engagement with the carriers to suspend the drape therefrom, the upper edge portion of the drape being free for bending inwardly to close the space between the carriers and a casket supported on the truck.

DERRELL E. BROWN.